(12) United States Patent
Wootton et al.

(10) Patent No.: US 8,928,769 B2
(45) Date of Patent: Jan. 6, 2015

(54) METHOD FOR IMAGE PROCESSING OF HIGH-BIT DEPTH SENSORS

(75) Inventors: Matthew Wootton, O'Fallon, MO (US); Christopher Nissman, University City, MO (US); Michael Luecking, Belleville, IL (US); Matthew Blevins, Saint Peters, MO (US)

(73) Assignee: DRS Sustainment Systems, Inc., St. Louis, MO (US)

(*) Notice: Subject to any disclaimer, the term of this patent is extended or adjusted under 35 U.S.C. 154(b) by 778 days.

(21) Appl. No.: 13/077,443

(22) Filed: Mar. 31, 2011

(65) Prior Publication Data

US 2012/0249827 A1  Oct. 4, 2012

(51) Int. Cl.
*H04N 5/228* (2006.01)
*G06K 9/36* (2006.01)
*G06T 3/40* (2006.01)
*H04N 9/43* (2006.01)

(52) U.S. Cl.
CPC ............... *H04N 9/43* (2013.01); *G06T 3/4007* (2013.01)
USPC ........................................ 348/222.1; 382/167

(58) Field of Classification Search
CPC ......... H04N 9/045; H04N 9/735; H04N 9/43; G06T 5/001
USPC .............................. 348/222.1, 223.1; 382/167
See application file for complete search history.

(56) References Cited

U.S. PATENT DOCUMENTS

| | | | |
|---|---|---|---|
| 4,608,596 A | 8/1986 | Williams et al. | |
| 4,862,256 A | 8/1989 | Markle et al. | |
| 5,029,107 A | 7/1991 | Lee | |
| 5,093,717 A | 3/1992 | Sandrew | |
| 5,148,294 A | 9/1992 | Kurogane et al. | |
| 5,182,639 A | 1/1993 | Jutamulia et al. | |
| 5,289,297 A | 2/1994 | Bollman et al. | |
| 5,333,243 A | 7/1994 | Best et al. | |
| 5,418,895 A | 5/1995 | Lee | |
| 5,911,003 A | 6/1999 | Sones | |
| 5,912,994 A | 6/1999 | Norton et al. | |
| 6,226,398 B1 | 5/2001 | O'Neill, Jr. et al. | |
| 6,366,694 B1 | 4/2002 | Acharya | |
| 6,373,533 B1 | 4/2002 | Kawabata et al. | |
| 6,535,649 B1 | 3/2003 | Chiu | |
| 6,681,054 B1 | 1/2004 | Gindele | |
| 6,819,796 B2 | 11/2004 | Hong et al. | |
| 6,868,179 B2 | 3/2005 | Gruzdev et al. | |
| 6,947,593 B2 | 9/2005 | Jia et al. | |

(Continued)

OTHER PUBLICATIONS

Rogowitz; B. E. et al.; "Why Should Engineers and Scientists Be Worried About Color?"; IBM Research; http://www.research.ibm.com/people/l/lloydt/color/color.HTM; Oct. 13, 2010; 13 pages.

(Continued)

*Primary Examiner* — Mekonnen Dagnew
(74) *Attorney, Agent, or Firm* — Kilpatrick Townsend & Stockton LLP

(57) ABSTRACT

High-bit depth sensors often capture more information then can be displayed on a commercially available display. Due to this, image processing systems and methods are disclosed to ensure that as much information as possible is presented to a user in a meaningful and statistically significant manner. The image processing systems and methods disclosed herein allow a user to view and process data that would otherwise be invisible to the user.

26 Claims, 8 Drawing Sheets

(56) References Cited

U.S. PATENT DOCUMENTS

| | | |
|---|---|---|
| 6,983,068 B2 | 1/2006 | Prabhakar et al. |
| 6,995,791 B2 | 2/2006 | Skow |
| 7,003,153 B1 | 2/2006 | Kerofsky |
| 7,155,029 B2 | 12/2006 | King et al. |
| 7,242,435 B2 | 7/2007 | Lin et al. |
| 7,283,667 B2 | 10/2007 | Takeshita |
| 7,358,976 B2 | 4/2008 | Hampshire et al. |
| 7,428,332 B2 | 9/2008 | Spaulding et al. |
| 7,489,831 B2 | 2/2009 | Lee et al. |
| 7,639,893 B2 | 12/2009 | Duan et al. |
| 7,643,035 B2 | 1/2010 | Toyama et al. |
| 7,747,098 B2 | 6/2010 | Ward |
| 7,817,852 B2 | 10/2010 | Amagai |
| 2005/0105147 A1 | 5/2005 | Gruzdev et al. |
| 2007/0025625 A1* | 2/2007 | Burian et al. ............ 382/237 |
| 2008/0152223 A1 | 6/2008 | Maeda |
| 2009/0109233 A1 | 4/2009 | Kerofsky et al. |
| 2009/0167672 A1 | 7/2009 | Kerofsky |
| 2009/0244366 A1 | 10/2009 | Kamimura |
| 2010/0054542 A1 | 3/2010 | Archibald et al. |
| 2010/0195901 A1 | 8/2010 | Andrus et al. |
| 2010/0214472 A1 | 8/2010 | Tomonaga |
| 2011/0211758 A1* | 9/2011 | Joshi et al. ............ 382/167 |
| 2012/0206470 A1* | 8/2012 | Frank et al. ............ 345/581 |

OTHER PUBLICATIONS

Bergman, L. D. et al.; "A Rule-based Tool for Assisting Colormap Selection"; IBM Research; http://www.research.ibm.com/dx/proceedings/pravda/index.htm; Oct. 13, 2010; 20 pages.

"Understanding Local Contrast Enhancement"; The Luminous Landscape; http://www.luminous-landscape.com/tutorials/contrst-enhancement.shtml; Oct. 13, 2010; 4 pages.

"Contrast Enhancement Through Localized Histogram Equalization"; Cromwell International; http://www.cromwell-intl.com/3d/histogram/; Oct. 13, 2010; 11 pages.

Petrov, G. "Automatic Image Segmentation Using 2D Multistage Entropy"; Instrumentation.hit.bg; http://instrumentation.hit.bg/Papers/2007-08-17%202D%20Multistage%20Entropy.htm; Oct. 13, 2010; 8 pages.

* cited by examiner

|    | a1 | a2 | a3 | a4 | a5 | a6  | a7  | a8 | a9  | a10 |
|----|----|----|----|----|----|-----|-----|----|-----|-----|
| b1 | 1  | 3  | 4  | 6  | 7  | 3   | 8   | 1  | 1   | 3   |
| b2 | 1  | 4  | 3  | 14 | 16 | 33  | 5   | 49 | 255 | 0   |
| b3 | 3  | 1  | 4  | 14 | 20 | 33  | 16  | 12 | 3   | 7   |
| b4 | 1  | 66 | 54 | 0  | 5  | 33  | 16  | 49 | 3   | 9   |
| b5 | 3  | 5  | 9  | 20 | 20 | 27  | 0   | 12 | 3   | 3   |
| b6 | 4  | 5  | 6  | 0  | 27 | 33  | 62  | 62 | 1   | 1   |
| b7 | 3  | 5  | 3  | 12 | 15 | 151 | 17  | 12 | 3   | 3   |

FIG. 6

METHOD FOR IMAGE PROCESSING OF HIGH-BIT DEPTH SENSORS

COPYRIGHT AUTHORIZATION

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

TECHNICAL FIELD

The present invention relates to an image processing method and more particularly to a method for processing images obtained from high-bit depth sensors.

BACKGROUND

Many systems and methods exist for processing images obtained from standard-bit depth sensors and cameras. However, when employing high-bit sensors such as x-rays, high dynamic range monochromatic day cameras, image intensifiers, and infrared imagers for example, some of the information captured in the digital image is lost or not displayed to the user when utilizing standard processing techniques. This is due to the fact that typical commercial displays utilizes an 8-bit format to display information. Contrastingly, certain high-bit sensors gather information in 10, 12 or even 16-bit format. The additional information contained in the images captured by high-bit sensors therefore cannot be accurately displayed or displayed in a useful manner on a commercial 8-bit display.

Typical commercial color displays containing 8-bit resolution are relatively inexpensive and commonly available. Higher bit depth monitors, i.e., those capable of processing 10, 12, or even 16 bits of information are not as common and are often very expensive. Monochrome monitors are typically 10-bit monitors and allow for display of higher depth of information. These 10-bit monitors, are similar to color or RGB monitors with the color filters removed, thereby allowing for the two additional bits of information. However, such higher bit monitors are more expensive and are not as common place as typical lower-bit color monitors.

High-bit depth sensors typically capture images monochromatically. At times, it is desirable to color enhance the images to allow the user to process the data. Standard color enhancement techniques, however, often make enhanced images confusing or mask detailed data contained in the image.

Typical image processing that includes any sort of frame averaging suffers from temporal blurring effects when an object moves rapidly within a frame.

High-bit sensors may at times contain more data then can be readily displayed, typically, high-bit sensor data processing results in a loss of contrast as a result of attempting to process the most globally statistically significant data at the expense of the local or detailed data.

Accordingly, a need therefore exists for an image processing method that maximizes the information availability and usefulness through the processing of captured imagery or video from a high-bit depth sensor and presents it to a user utilizing a commercially available lower-bit display.

Furthermore, a need exists for an image processing method and apparatus that can color enhance high-bit depth monochromatic images in such a manner as to allow the enhanced images to be displayed and understood by a user utilizing a standard color monitor.

Additionally, a need exists for an image processing technique that allows for averaging to be on at all times to remove such noise without suffering from the blurring effects typically caused by frame averaging.

Similarly, there is a need for an image processing method that processes data both on a global basis as well as on a local basis, to ensure that both the statistically significant data is presented to the user, that the relative position of the elements are maintained, and local contrasts are maintained.

The present invention overcomes these needs in the prior art.

SUMMARY

The system and method disclosed herein relate to image processing from high-bit depth sensors. Often times, systems containing high-bit sensors such as infrared, x-rays, high dynamic range monochromatic day cameras, image intensifiers, and infrared imagers for example, capture more information then can be displayed on a commercially available display. Due to this, image processing systems and methods must be employed to ensure that as much information as possible is presented to a user in a meaningful and statistically significant manner. Without image processing, significant data and valuable information would be invisible to the user.

Accordingly, the image processing methods and systems disclosed herein are intended to be implemented between a sensor system and commercial display systems. In this way, the image processing system and methods utilized merely receives information from the sensor, processes it, and output the end result to a commercial display system. As a result of the lack of feedback and control between the different elements, the image processing system and method is a stand-alone element in the system and is not tied to any specific sensor or display. It should be understood, that the term image used herein refers to any digital image including single frame images as well as continuous video images.

It should be understood that when processing video images, the disclosed method employs a dynamic frame averaging that allows for greater information averaging without the introduction of motion blur. In one embodiment for processing video images, the averaging method is reset upon a rapid or large change to the base information such that motion blur does not occur, but the information is still averaged over time (i.e., frame to frame) to improve the effective sensitivity of the sensor.

The system further improves image quality by removing halo edge effects often associated with high-bit depth sensor information displays while increasing overall image contrast. This is due to the local area contrast enhancement feature disclosed herein. The halo effect or fuzziness often associated with high-bit depth sensor images is a result of the typical image filters employed in the traditional processing chain.

The system and method herein disclosed may also implement color mapping. In one embodiment, the disclosed method and system maps indexed image information into Red-Green-and Blue (RGB) values in such a way that an 8-bit color display can achieve approximately the same number of unique levels as a 10-bit monochromatic display with similar performance characteristics. Another important component of the present method and system is the value rank based processing done in the system. This is especially helpful when utilizing the local contrast enhancement methods herein described which can display all information recorded by the sensor.

The present method and systems may also employ a particular order of operations for the processing. While the contemplated steps disclosed herein may be performed in any order, it has been found that by performing the steps in a specific order, performance and results are enhanced.

In an embodiment of the present invention, a novel order of operations for performing image processing has been developed to push information through the image processing chain at the final image size and zoom level. This is accomplished by interpolating the incoming image information into its final size (including any additional zoom enhancement) prior to passing it through the image processing step. The image processing portion is then done with algorithms applied both in series and in parallel. The outputs of the algorithms are then combined to produce an indexed image. A color map is optionally applied to the indexed image to produce the final output image.

In another embodiment of the present invention, the dynamic frame averaging is performed first, followed by image interpolation, parallel image processing, weighted average of processed images, and finally application of a color map. By utilizing this order of operations, it has been found that the maximum amount of information through the imaging chain is maintained and allows for image processing to occur on parallel architectures.

In an embodiment, the implementation of the order of operations and algorithms is applied to the sensor information using the OpenCL framework which allows them to run on a plurality of devices in a manner controlled by the "host" device. The use of OpenCL facilitates the addition and removal of components as technology progresses such that the algorithms can be ported to the most recent hardware.

In an embodiment, a method for dynamically averaging consecutive images is disclosed where the steps involve storing a first value of a pixel, establishing a threshold level for the stored value of the pixel, capturing a second value of the pixel, comparing the second value of the pixel to the first value of the pixel, determining if the second value of the pixel exceeds the threshold level, and storing a new value of the pixel in response to the determining.

In one embodiment, a method for processing an image is disclosed. The method comprising the steps of receiving an image from a high-bit sensor, interpolating the image to its final output size. Globally processing the image, locally processing the image, weighting the globally processed image and the locally processed image and then combining the weighted images, and finally outputting the image to a display.

In another embodiment the method includes color enhancing the combined weighted image before outputting the image to the display.

In a further embodiment, the method comprises dynamically averaging the image wherein the image is a video image comprising consecutive frames.

In another embodiment, a method for enhancing the display resolution of a high-bit monochrome image for display on a lower resolution monitor is disclosed. The method processes the high-bit monochrome image for use on the lower bit depth monitor. It adds pseudo-color to the processed high-bit monochrome image, and maps the pseudo-color image to a plurality of color layers. Finally, the mapped image is plurality of color layers is displayed simultaneously on the lower bit depth monitor to form a single image.

BRIEF DESCRIPTION OF THE DRAWINGS

The system and method, in accordance with one or more embodiments, is described in detail with reference to the following drawings. The drawings are provided for purposes of illustration only and merely depict typical or example embodiments. These drawings are provided to facilitate the reader's understanding and shall not be considered limiting of the breadth, scope, or applicability of the disclosure. It should be noted that for clarity and ease of illustration these drawings are not necessarily made to scale.

Some of the figures included herein illustrate various embodiments from different viewing angles. Although the accompanying descriptive text may refer to such views as "top," "bottom" or "side" views, such references are merely descriptive and do not imply or require that the embodiment be implemented or used in a particular spatial orientation unless explicitly stated otherwise.

FIG. 6 depicts a matrix of pixel values utilized in the local processing of an embodiment;

The figures are not intended to be exhaustive or limited to the precise form disclosed. It should be understood that the embodiments can be practiced with modification and alteration, and that it is limited only by the claims and the equivalents thereof.

DETAILED DESCRIPTION

The present disclosure is described herein in terms of example embodiments. Descriptions in terms of these embodiments are provided to allow the various features to be portrayed in the context of an exemplary application. As will be clear to one of ordinary skill in the art, the systems and methods can be implemented in different and alternative embodiments without departing from the spirit of the invention.

Unless defined otherwise, all technical and scientific terms used herein have the same meaning as is commonly understood by one of ordinary skill in the present field of technology. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
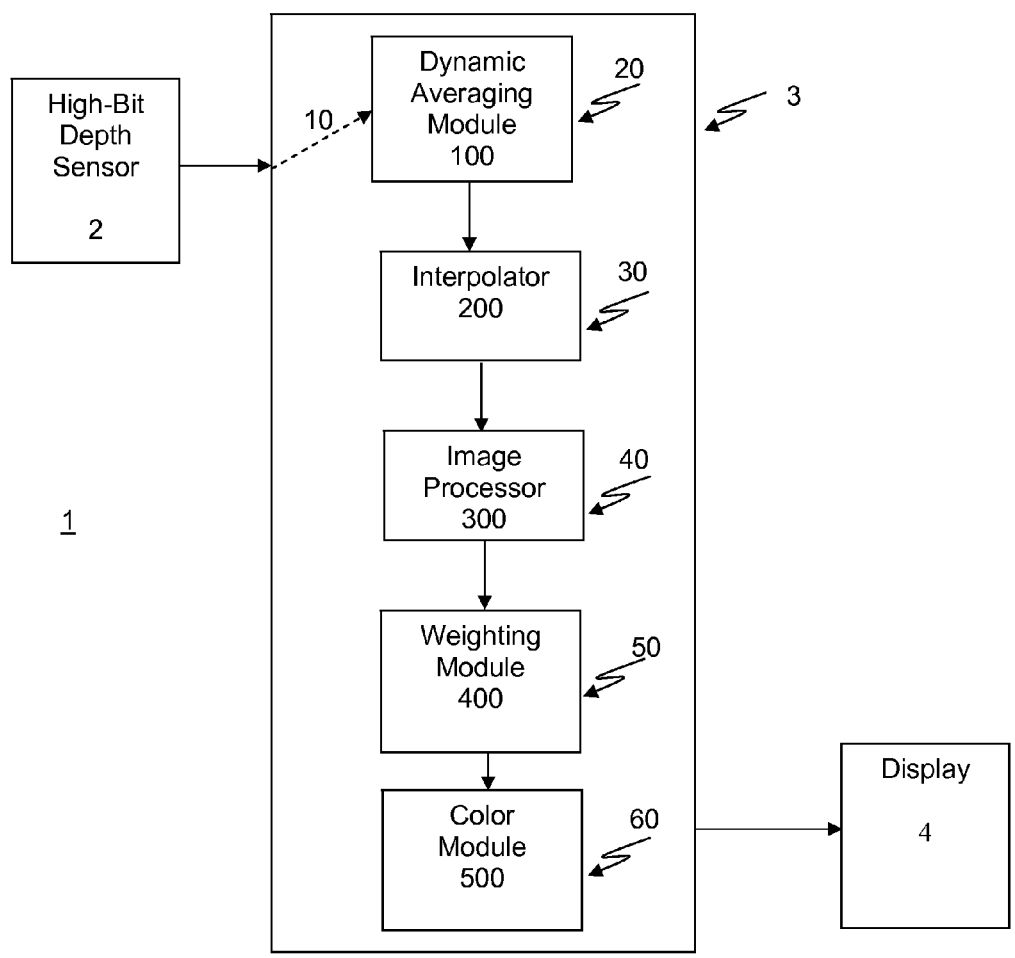
FIG. 1 depicts an overview of one embodiment of the image processing method.

FIG. 1 depicts an embodiment of a video image processing method. The method works to maximize the fidelity of the information which is passed through the system at any one time. At step 10, processor system 3 receives sensor information from sensor 2. At step 20, sensor information is dynamically averaged by averaging module 100 to remove temporal noise without causing motion blur. In this embodiment no other de-noising techniques are utilized in order to ensure the retention of the maximum amount of data and to maximize information fidelity. Next, at step 30, the dynamically averaged information is passed to interpolator 200. Interpolator 200 may employ any one of the well known interpolation techniques that increase the number of pixels to meet the display criteria or correct the aspect ratio of the camera to the display. As will be appreciated by one skilled in the art, this can be a simple linear interpolator or something much more complex such as a bilinear or bi-cubic interpolator depending on the requirements of the application without impacting or departing from the disclosed method. In one embodiment, a linear type of interpolator was utilized.

Interpolation step 30 brings the image to the final size to be displayed. As will be appreciated and understood by those skilled in the art, performing the steps in this order, requires an increase in processing requirements on the image processing side. However, it has been found to improve performance by maximizing the amount of data which is passed into the image processing step. It should be noted however, that with the exception of the parallel image processing of step 40 in image processor 300, the disclosed steps may be performed in any order without departing from the disclosed method. That is, interpolation, and/or dynamic averaging may be performed in different orders, or may even be performed after the parallel image processing of step 40. The only constraint is that the color enhancement must be applied at the final step.

Figure 2:
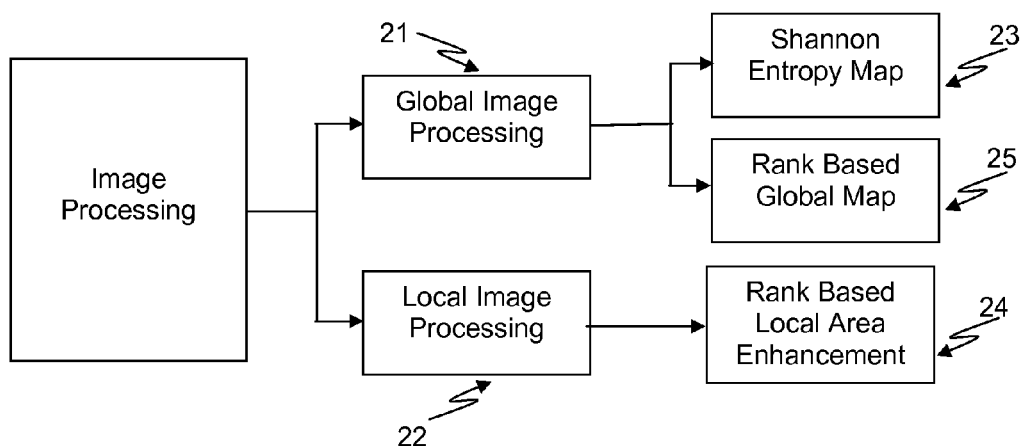
FIG. 2 depicts a schematic representation of the parallel image processing algorithms in accordance with an embodiment.

Image information is processed at step 40 utilizing image processor 300 and the method disclosed in accordance with FIG. 2. At step 50, the processed data is averaged together in weighting module 400 utilizing a weighted average between the locally enhanced image and the globally processed image. At this point, the image may be output to display 4 or a color map may be applied to the final image at step 60 utilizing color module 500. As will be appreciated by those skilled in the art, some or all of these steps may be performed depending on the particular equipment utilized or the type of information being processed. For example, the image could be a single image or continuous video imagery. If the image is a single frame of image, then dynamic averaging need not be applied. However, if the image is video, then the dynamic averaging technique described herein may be employed. Similarly, if sensor 2 generates sufficient data to meet the display's requirements, interpolation may not be needed. Similarly, color enhancement, while preferred, is not required to practice the innovations disclosed. As noted above, the described steps may be performed in different order to enhance or optimize the processing.

Dynamic Information Averaging

The present method allows for near infinite averaging on a per pixel basis in such a way that any rapid changes to the information (i.e., movement) causes the pixel to be reset and averaging restarted. By utilizing this method, averaging can be on at all times to remove temporal noise without suffering from blurring issues associated with traditional frame averaging. Because the same pixel is averaged over time with thresholds, motion blur is eliminated while achieving significant temporal averaging. The current method works to maximize the fidelity of the information which is passed through the system at any one time.

Figure 3:
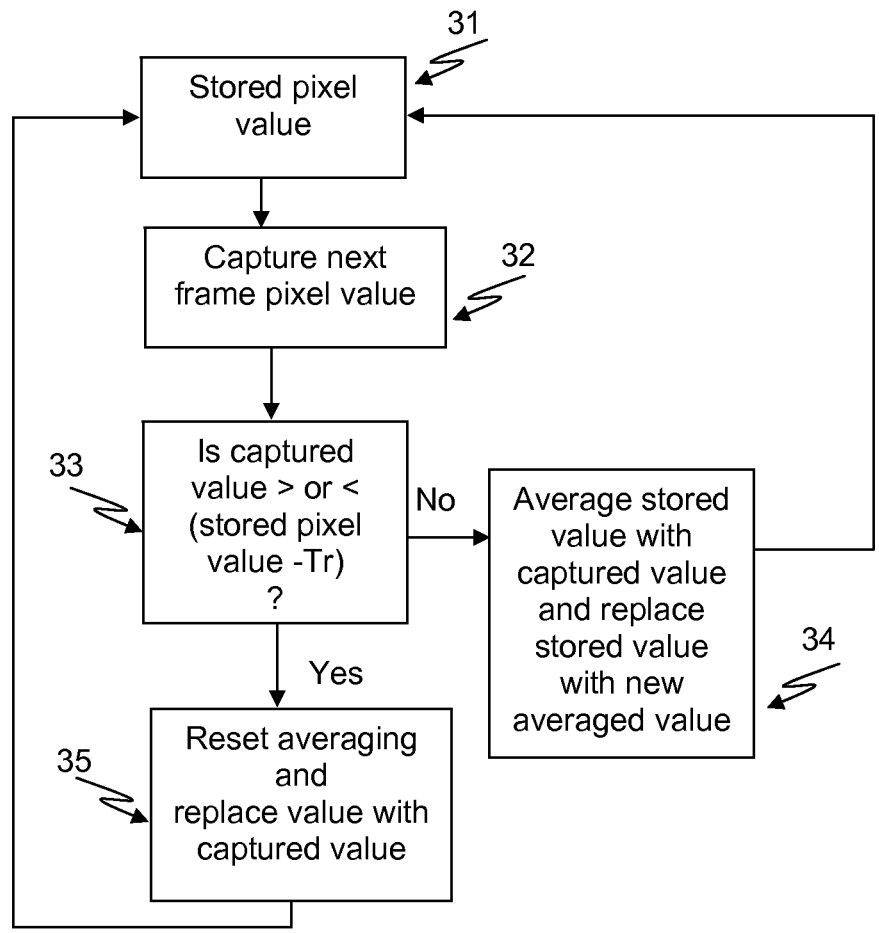
FIG. 3 is a flow chart of the dynamic averaging method in accordance with an embodiment.

In one embodiment, each pixel of the image is averaged with the pixel from the previous frame if it falls within a specific threshold requirement. The threshold may be a fixed value or a function. If a function is chosen, it has been noted that one that operates in a decreasing manner yields acceptable results. FIG. 3 depicts the steps involved in dynamic averaging. At step 31, a value for a pixel is stored. At step 32, a second value for that same pixel is captured in the next subsequent frame of video. The second value is compared to the first value in step 33 to determine if it exceeds the threshold value or function chosen. If the second value does not exceed the threshold, it is averaged with the first value at step 34 and the new value is stored back at step 31 and the process repeats. When the value of the pixel exceeds the threshold of step 33, the averaging is reset at step 35 and the new captured value replaces the stored value back at step 31. This process repeats as long as frames of video are received.

For example, in operation, a threshold Tr may be chosen for the dynamic averaging threshold value. If the value of a pixel located at xy in $frame_z$ is a0 and the value of pixel xy in $frame_{z+1}$ is a1 then the two pixel values will be averaged together to arrive at the average value $a1_{avg}$ for $frame_{z1}$ as long as a1 is not greater than a0+Tr or less than a0−Tr. In the next frame, however, if the pixel value a2 for pixel xy in $frame_{z+2}$ does not fall between $a1_{avg}$+Tr and $a1_{avg}$−Tr, then $a1_{avg}$ and a2 will not be averaged together to arrive at $a2_{avg}$, but instead the new value of pixel xy will be a2. The averaging process is weighted such that all values have equivalent weight. In this way, the second frame within the threshold would have an equal weight with the original, the third would be ⅓ of the final value, and the fourth would be ¼ and so on. This process continues as long as new frames of video are received. For example, in operation, a threshold of +/−5 may be chosen for the dynamic averaging. If the value of a pixel xy in frame 1 is 3 and the value of pixel xy in frame 2 is 5 then the two will be averaged for a new xy pixel value of 4. If the value of pixel xy in frame 3 is 7, the value of pixel xy value will be compared to the current average (4) using the threshold of +/−5. If it falls within that limit, it will be averaged with the previous value and the new value of pixel xy will be 5=(4*2+7)/3 and so on. If however, the value of pixel xy in frame 4 exceeds the threshold value i.e., new value for xy is 12, then averaging will not be performed and the new pixel value xy in frame 4 will be reset to a value of 12 and so on. In this manner each pixel value is averaged on a per frame basis with the pixel value of the previous frame.

By utilizing such dynamic averaging and by resetting pixel values the problem of blurring images due to moving objects is eliminated. For example when observing a thermal image of a body in motion, such as a waving hand, the image tends to be blurred containing trails of the thermal signature as a result of inadequate frame to frame pixel averaging. Utilizing the dynamic averaging method of the present embodiment eliminates that blurring or trailing effect because the pixels that encounter large jumps in value will be reset and will no longer contain the residual value of a thermal image that is no longer present.

Image Processing

FIG. 2 depicts the parallel image processing steps of an embodiment with the global image processing step 21 and local image processing step 22 performed in parallel. Both local and global processing are carried out for each image. Global image processing step 21 implements either Shannon based entropy mapping of information 23 or rank based global map step 25. Shannon entropy map step 23 is selected if the number of unique values produced by high-bit depth sensor 2 exceeds the number of unique values that can be displayed by display 4. When the number of unique values produced by sensor 2 is lower than the number of unique values display 4 is capable of producing, a rank based global map is produced utilizing step 25. If the number of unique values produced by high-bit depth sensor 2 equals the number of unique values that can be displayed by display 4, the rank based global map simply remaps the unique values in order onto the available display contrast. Contrastingly, local area processing step 22, which occurs for every image and which processes the data in parallel with either steps 23 or 25 processes the data on a local scale utilizing rank based processing and a "sliding pixel window." Rank based local processing step 24 is implemented in order to improve local contrast between values and ensures that the relative information is maintained without allowing the absolute information to skew the mapping. While it is performed utilizing a sliding pixel window, it is performed for the entire image.

Global Area Processing

Shannon Entropy Image Compression

While other image compression algorithms may be utilized, in one embodiment, given that the bit depth of the sensor information is higher than that of the display, an algorithm is proposed that utilizes Shannon entropy based image compression to compress sensor information for display purposes. As will be appreciated by those skilled in the art the more information available from the sensor, i.e., a higher bit depth, the higher image fidelity is possible and more accurate representation is possible. Accordingly, it is desirable to maintain as many pixel values as possible within the confines of the display's available range.

Shannon entropy mapping step 23 passes the most statistically significant information through system 1 for display while maintaining the relative value relationships of the incoming information. The algorithm used in the embodiment allows image information to be mapped to a statistical maximum for a given display, i.e., losses processed with respect to the constraints of the display. By relying on such an algorithm the relationship between all the pixel values are maintained.

In one embodiment, a multistage Shannon entropy function is utilized to maximize the amount of information available to the display. Specifically, by choosing only the highest returned entropy values it was found that 12-bit depth information could be processed and then the 10-bit data with the highest entropy value could be chosen, resulting in the best image. In the embodiment, an image histogram is generated containing an equivalent number of possible values as that of the sensor. Next, all the zero entries in the histogram are removed, and the histogram is normalized. Once normalized, entropy is computed. Then, the image is remapped according to the results of the entropy function.

Calculation of the entropy function is a procedure that measures each histogram's column's probability of corresponding to the total information inside all other pixels. Such a calculation is helpful for automatic image processing and is described in "Comparison of Global Histogram Methods for 2D and 3D Entropy Based Image Segmentation" by Petrov, Illiev and Tzvetkov, 9th WSEAS International Conference on EVOLUTIONARY COMPUTING (EC'08), Sofia, Bulgaria, May 2-4, 2008, pg 57-62, ISBN: 978-960-6766-58-9, which is incorporated herein by reference in its entirety. The process described by Petrov et al., is for image segmentation, however, in the present invention, it is being used to extract maximum information from the system.

Once the histogram entropy function is calculated, entropy maximum and maximum position are used as thresholds for image quantization. That is, the values are used to establish the thresholds for combining columns.

As noted above, the operations for computing the multistage Shannon entropy functions are performed on normalized image histograms. For a standard 8 bit grey level image, for example, a corresponding normalized histogram is generated:

$P_{(D)} = \{p_0, p_1, \ldots p_b, \ldots, p_{255}\}$ where $P_{(D)}$ is the normalized image histogram, "p" is the probability of the corresponding pixel to occur having a brightness value "b", where b=0, 1, ..., 255.

In the next step, image entropy function $H(P_{(D)})$ is calculated using the discrete histogram $P_{(D)}$.

$$H(A) = -\sum_{i=0}^{b} p_i \log p_i$$

$$H(B) = -\sum_{i=b}^{255} p_i \log p_i$$

$$H_b = -\log P(A) - \log P(B) - \frac{H(A)}{P(A)} - \frac{H(B)}{P(B)}$$

Where b=var from 0 to 255; A=var from 0 to b; and B=var from 255 to b.

$H(P_{(D)})=\{H_0, H_1, \ldots, H_b \ldots, H_{255}\}$. Entropy maximum (Max) can then be found to be max $H(P_{(D)})$ where the maximum of the entropy function defines the brightness threshold value "b*" for the image.

Such an entropy approach is best used with fixed images. In the case of moving objects, however, a different approach is required. By utilizing multi-stage entropy, the image can be broken down into smaller partitions. Multistage entropy differs from single stage only by number of iterations and histogram divisions. To extract the maximum information from the system, the image histogram is divided several times over selected areas inside the histogram.

A first entropy maximum is calculated. Next, an entropy maximum between a value of 0 and the first maximum position is calculated. Next, an entropy maximum position is calculated between the first maximum and the last element of the image histogram. For example, calculate b* from $H(P_{(D)})$, where b=var from 0 to 255.

Second divide the histogram into two equal histograms $P1_{(D)}$ and $P2_{(D)}$ where $$p1_b = \begin{cases} p_b & \text{if } b^* \leq \text{Max} \\ 0 & \text{if } b^* > \text{Max} \end{cases}$$

$$p2_b = \begin{cases} p_b & \text{if } b^* \geq \text{Max} \\ 0 & \text{if } b^* < \text{Max} \end{cases}$$

where b=var from 0-255 and Max is as defined above.

Third, the values of $H(P1_{(D)})$ and $H(P2_{(D)})$ are calculated and then b1* for $P1_{(D)}$ is calculated. Finally, b2* for $P2_{(D)}$ is calculated. Once, b*, b1* and b2*, are calculated, the maximum entropy functions can be calculated for different $P_{(D)}$ intervals.

This iterative process results in multiple layers or entropy values. In this manner, the maximum amount of information may be extracted from the system.

While the above algorithm may be used in an embodiment and yields the desired results, as will be appreciated by those skilled in the art, other image processing algorithms that maintain the relationship between pixels can be utilized without departing from the systems and methods disclosed.

Rank Based Global

When the number of unique values produced by sensor 2 is lower than the number of unique values display 4 is capable of producing, a rank based global map is produced utilizing step 25. This rank based global map ensures that all of the information is present on display 4 and that the relative positions of the elements are maintained. The rank based global processing utilized in an embodiment is a variation on a standard automatic gain control (AGC) correction circuit.

Figure 4:
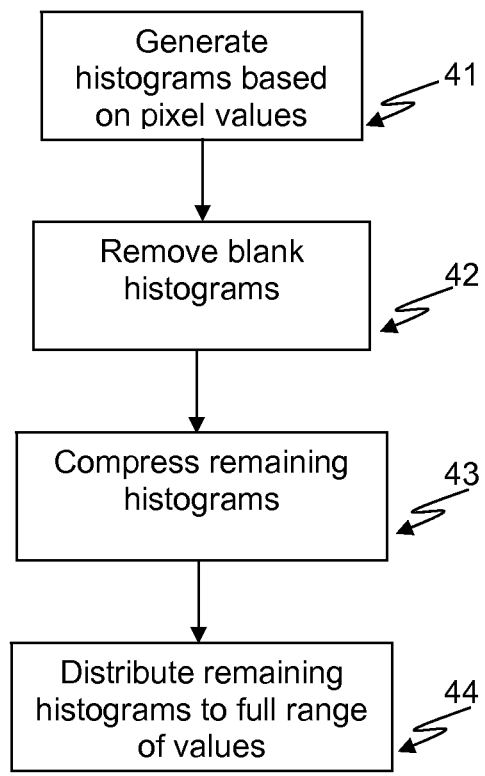
FIG. 4 is a flow chart of the global rank based processing of an embodiment.
Figure 5A:
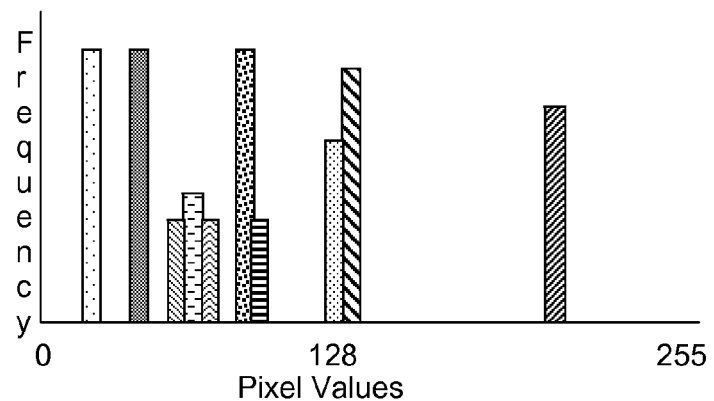
FIGS. 5a-5c depict the histograms generated as a result of the global rank based processing of an embodiment.
Figure 5B:
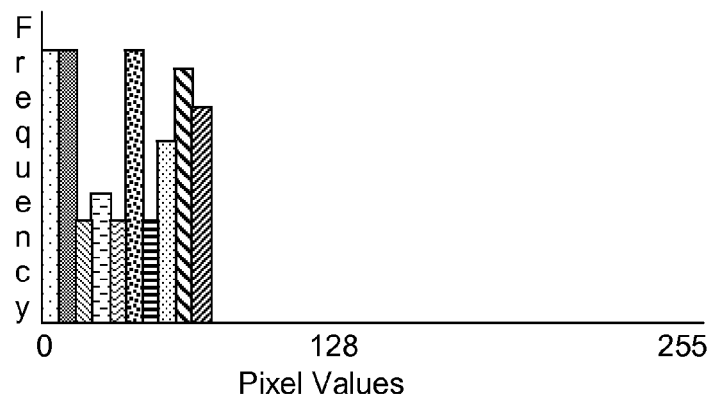
Figure 5C:
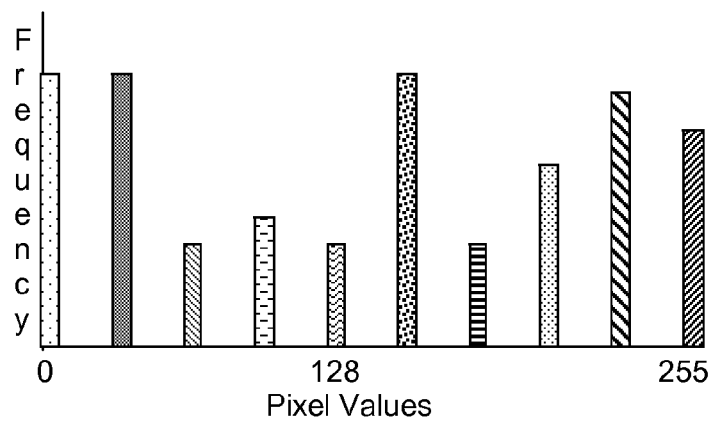

Following the interpolation step which increases the number of pixel values to match the display capabilities, initial histograms of the pixel values are created. FIG. 4 shows the flow of the rank based global mapping. First, at step 21 of FIG. 2, it is determined if Shannon based entropy mapping 23 is to be performed or if rank based global mapping 25 is required. If it is determined that a rank based global map 25 is to be generated, then as shown in FIG. 4, at step 41, a histogram is calculated for each image and all possible pixel values based on value and not frequency (See FIG. 5*a*). At step 42 the pixel values that are present in the histogram are then remapped in rank order from smallest value to largest value, eliminating the empty columns in between. At step 43 and as seen in FIG. 5*b* the histograms are compressed removing any empty space. At step 44 and as depicted in FIG. 5*c*, the remapped histogram are then linearly scaled up and remapped again based on the number of possible values up to the maximum number of available levels, as defined by the monitor hardware and the specific implementation. For example, in FIGS. 5*a*-5*c*, there are 256 possible pixel values shown. This is to be understood as purely exemplary and in no way a limitation on the rank based global mapping. By way of example if all pixels in an image fall into 10 distinct columns (see FIG. 5*a*), those values could be spread randomly across the entire possible 256 columns. In step 42 and 43, the blank or empty columns are removed and the column with the smallest value will be mapped into column 0 and the one with the largest value will be mapped into column 10 (FIG. 5*b*). In step 44, the columns are remapped with the column with the smallest value remaining in column 0 and the column with the highest value being mapped into column 255. The remaining 8 columns are remapped and linearly distributed across the remaining 254 values. (See FIG. 5*c*). In this manner, the pixels retain their relational position with respect to each other while at the same time spreading the pixel values evenly across the entire range of possible values to enhance the images contrast.

Local Area Processing

Referring again to FIG. 2, local image processing or local area contrast enhancement 22 may be performed in parallel with the global image processing described above. Utilizing local area enhancement, the image is segmented into smaller regions and histogram equalization is independently applied to each central pixel (or cluster of pixels) within the small regions of the image. Local area processing increases the contrast of the image on a local scale but for every pixel in the image; however, at 100% local area processing, the resulting image takes on a surreal look that may not be desirable to all end users. As local enhancement is added, smaller details present greater contrast when compared with the less enhanced image; however, some of the original "reality" of the image may be lost in doing so.

One of the unique features of the local area contrast enhancement of the present invention is that it is rank based and not purely contrast value based. In other words, large absolute differences in value do not drastically affect the local area window. That means that the halo effect often found in high-bit depth sensor images does not appear in the enhanced images. While any type of local area contrast enhancement such as adaptive histogram, rank based, or a bi-cubic technique, such as convolution coding, may be utilized, in one embodiment rank ordering has been utilized.

In an embodiment of the present invention, the window size of the local contrast enhancement can be defined by the end user. The local contrast enhancement window is defined in terms of pixel width by pixel height. The width and height must be equal resulting in a square window and the dimension must be an odd number of pixels so as to result in a central pixel surrounded by a frame of pixels. The larger the window selected, the lower the contrast enhancement, and the smaller the window, the greater the contrast enhancement. In one embodiment it was noted that a window size of between 9×9 and 25×25 pixels yielded the best contrast enhancement, although some windows as large as 61×61 pixels resulted in very acceptable images. As will be appreciated by those skilled in the art, the window selection size will be a matter of design and implementation choice.

If too small a window is selected, the processing may become very pixilated due to the few number of image values stretched across the entire range of values, resulting in too large a contrast change. For example, processing on a 3×3 local contrast matrix yields a possible 9 pixel values where the range of displayable pixel values is significantly larger (i.e., 10 bits or 1024 possible values). Stretching the possible 9 values into 1024 values yields significant contrast differences between the output values. While the intent of the local contrast is to enhance small details, since the central pixel (or central block of pixels) is the only pixel (or pixels) to be updated during local enhancement, the output values will be quite distinct, resulting in a lot of blacks, mid-level grays, and pure whites. This is due to the very large stretching of values indicated above. As a result, the output images coming from the local area processing with small window sizes are often quite difficult to interpret. Nevertheless, the method still effectively increases the local contrast in an understandable way when combined in a weighted average with the global map as discussed more fully below.

To reduce the large stretching effect, it has been found that it is advantageous to increase the window size to force less value stretching when using local contrast enhancement. However, it is understood, that too large of a window does not enhance the contrast as much and incurs a higher processing cost. This is therefore a design consideration that the user must balance based on detail vs. image quality.

It should be understood, that the local processing is done on a pixel by pixel basis utilizing a rank order done per frame of an image. This is in contrast to the more traditional minimum and maximum and stretch techniques of the prior art which do not provide full information and pass through of data. Furthermore, processing the data on a pixel by pixel basis requires no post processing smoothing.

Figure 7A:
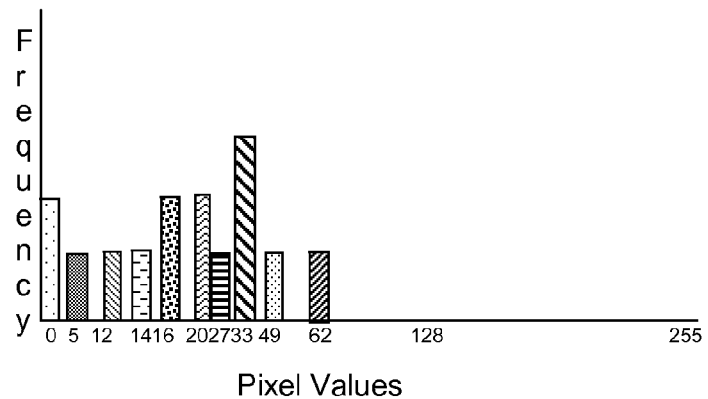
FIGS. 7a-7c depict the histograms generated as a result of the local contrast processing of an embodiment.
Figure 7B:
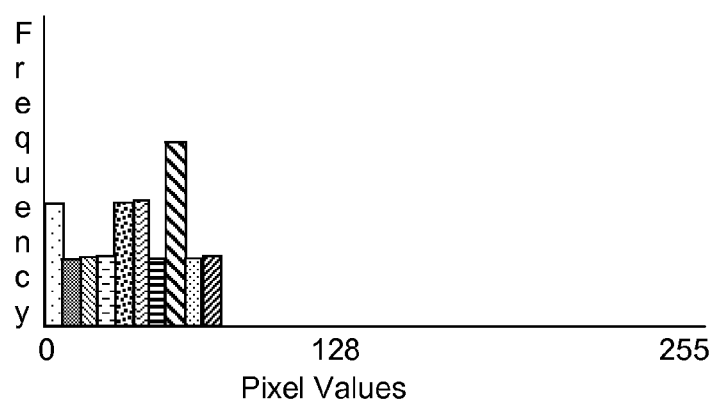
Figure 7C:
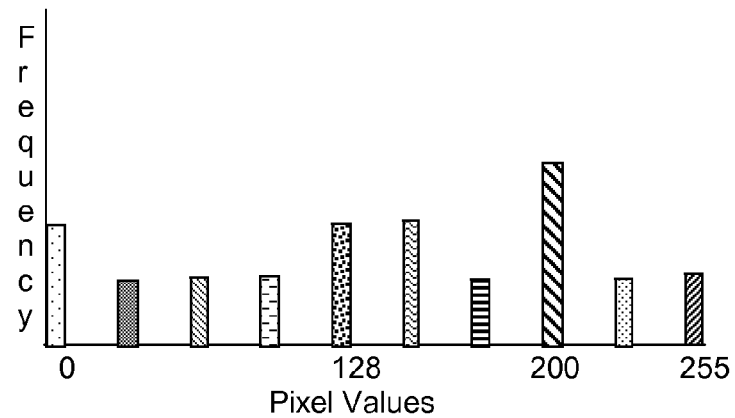

As an example, as seen in FIG. 6, the local contrast adjustment area 60 can be adjusted by the user to focus on a particular area of the image in this example, a window of 5×5 pixels is chosen resulting in 25 pixels values to be processed with a central pixel 61 having a value of 33. As with the rank order global processing, a histogram containing all possible values is formed (See FIG. 7*a*). Next, as seen in FIG. 7*b*, the blank space or empty columns between values are removed and the pixel values are then remapped linearly across the entire range of values from 0 to 255 as shown in FIG. 7*c*. Once the new central pixel 61 value is mapped, the central pixel value is stored for use in the locally enhanced image. In this case, the old value of 33 is replaced with new value 200. It should be understood, that the new central pixel value is not used when computing the enhanced value of the central pixel for the next window. Doing so, will alter the original image and impact the remaining local image enhancement. It should be further understood, that mapping is not limited to any specific number of bits or specific values, and the use of 256 values is merely exemplary.

It will be understood by those skilled in the art, that the processing power required to locally enhance the image on a pixel by pixel basis may be prohibitive, depending on image size. Accordingly, clusters of central pixels may be enhanced utilizing the local enhancement feature rather than single pixels. While this group enhancement will result in faster processing time, it is to be understood, that it may not result in an image as enhanced as one performed on a pixel by pixel basis. This is a design choice that needs to be determined, based on a determination of speed vs. enhancement.

After all the central pixels (or pixel groups) in an image are enhanced and stored, the locally enhanced image is combined with the global image utilizing a weighted average.

Weighted Averaging

Because the system incorporates local contrast enhancement as a weighted average with a global map, it becomes possible to easily tune the level of enhancement and not significantly change the base algorithms.

The combination of statistically significant global data and the locally enhanced contrast presents the end user with a very good rendition of the original data without requiring a high-bit depth display. Also, due to the typical sensitivity of the human eye, it is unlikely that a high-bit depth display does as much for the end user as an appropriately processed image or video.

The weighted averaging is a straight forward averaging of the global image and the local image processing. Weighting factors for each the global image and the locally enhanced image can be chosen based on the desired appearance the user wishes. In one embodiment it was found that utilizing weighting factors of ⅞ and ⅛ for the global map and the local map respectively yielded acceptable results. By way of example, weighting factor for the global map could be $W_G$ and for the local map $W_L$. The weighted average for any given pixel therefore would be $((W_G*\text{pixel value})+(W_L*\text{pixel value}))/(W_G+W_L)$. These final weighted image values can be directly output to a monitor or can be color enhanced to improve resolution.

Color Map Implementation

The color mapping of the present invention allows for a lower-bit color display to achieve a similar number of unique levels as a higher-bit monochrome display. For example, in one embodiment, a 10-bit monochrome image was enhanced and displayed on an 8-bit color display. Eight-bit color displays are common place and readily available, however, due to the 8-bit limitation per color, only 256 color values can be displayed. When used in conjunction with a high-bit depth sensor of 10-bits or more therefore, some information would necessary be lost or not displayable. In contrast, 10-bit monochrome monitors utilize 1024 values and are therefore more desirable in combination with high-bit depth sensors such as x-ray images, infrared imagers, etc. The typical 10-bit monitor however, is not generally available and it is often quite expensive. It is therefore desirable to utilize the standard lower-bit RGB monitor in such a way as to display as many values as possible to ensure comparability with a higher-bit monochromatic display.

The color mapping of the present invention involves the mapping of the image from indexed information into RGB values. In other words, the monochrome image from the high-bit sensor is mapped in such a way as to take advantage of the different color layers available in a color monitor to achieve a combined total of displayable values. In a standard RGB monitor for example, there are three color layers, each capable of displaying 256 values. Accordingly, by mapping a monochrome image onto all three layers, it is possible to achieve 768 values. This allows for an image containing 10-bit monochrome information (i.e., potential 1024 levels) to be output as 8-bit color information on the three RGB layers. Utilizing such color mapping techniques, allows for the display of 768 color-bit values, which has been found to be visually equivalent to a 10-bit monochromatic monitor.

This mapping is done in such a way as to maintain a generally increasing intensity with increasing values of return information from the sensor. In one embodiment, the color mapping adds a "hint" of color to the image without creating a false color map containing extreme color variations. With respect to the addition of a color map, more of the lower spatial frequency information (gradients) become visible without compromising the high spatial frequency details (smaller objects). The color map developed for one embodiment utilizes the colors on a spiral (maximum to minimum to maximum radius) drawn through the Hue Saturation Luminance (HSL) diamond color space such that it generally maintains an increasing luminance levels while moving around from blue to red hues. The particular "mask" utilized in the hue saturation and luminance space yields particular advantageous properties.

It should be understood that the implementation of such color enhancement is not limited to the example of an 8 bit color monitor and 10 bit monochrome image. The method disclosed herein, is equally applicable to higher bit sensor data and higher bit depth displays. For example, one could obtain the enhanced resolution of the present color enhancement method by displaying a 12 bit monochrome image (4096 values) on a 10-bit color monitor (1024*3=3072 values) by employing the present embodiment. It has been discovered that as long as the difference between the number of bits in the monochrome image is not greater than 2 bits of resolution of the color monitor, the image is beneficially enhanced.

In one embodiment utilizing color enhancement, the following MATLAB software routine was utilized to generate a suitable color map that generally enhances the image without creating a feeling of "false color."

TABLE 1

NumberSteps=1:1024;
Saturation=zeros(1,length(NumberSteps));
Luminance=zeros(1,length(NumberSteps));
Hue=zeros(1,length(NumberSteps));
Chroma=zeros(1,length(NumberSteps));
Hue_Prime=zeros(1,length(NumberSteps));
X=zeros(1,length(NumberSteps));
R=zeros(1,length(NumberSteps));
G=zeros(1,length(NumberSteps));
B=zeros(1,length(NumberSteps));
for StepNumber=NumberSteps;
   if StepNumber<(1/2)*length(NumberSteps)
      Saturation(StepNumber)=
        1-(StepNumber-1)/(1/2*length(NumberSteps)-1);
   else
      Saturation(StepNumber)=
(StepNumber1/2)*length(NumberSteps))/((1/2)*length(NumberSteps));
   end
   Luminance(StepNumber)=(StepNumber-1)./(length(NumberSteps)-1);
   Hue(StepNumber)=
240-240*(StepNumber-1)/(length(NumberSteps)-1);
if Luminance(StepNumber)<=1/2
      Chroma(StepNumber)=
2*Luminance(StepNumber)*Saturation(StepNumber);

TABLE 1-continued

```
else
      Chroma(StepNumber)=
(2-2*Luminance(StepNumber))*Saturation (StepNumber);
end
Hue_Prime(StepNumber)=Hue(StepNumber)./60;
X(StepNumber)=
Chroma(StepNumber)*(1-abs(mod(Hue_Prime (StepNumber),2)-1));
if Hue_Prime(StepNumber)>=0 && Hue_Prime(StepNumber)<1
      R1=Chroma(StepNumber);
      G1=X(StepNumber);
      B1=0;
end
if Hue_Prime(StepNumber)>=1 && Hue_Prime(StepNumber)<2
      R1=X(StepNumber);
      G1=Chroma(StepNumber);
      B1=0;
end
if Hue_Prime(StepNumber)>=2 && Hue_Prime(StepNumber)<3
      R1=0;
      G1=Chroma(StepNumber);
      B1=X(StepNumber);
end
if Hue_Prime(StepNumber)>=3 && Hue_Prime(StepNumber)<4
      R1=0;
      G1=X(StepNumber);
      B1=Chroma(StepNumber);
end
if Hue_Prime(StepNumber)>=4 && Hue_Prime(StepNumber)<5
      R1=X(StepNumber);
      G1=0;
      B1=Chroma(StepNumber);
end
if Hue_Prime(StepNumber)>=5 && Hue_Prime(StepNumber)<6
      R1=Chroma(StepNumber);
      G1=0;
      B1=X(StepNumber);
end
m=Luminance(StepNumber)-1/2*Chroma(StepNumber);
R(StepNumber)=R1+m;
G(StepNumber)=G1+m;
B(StepNumber)=B1+m;
end
ColorMap=zeros(1024,3);
ColorMap(:,1)=R';
ColorMap(:,2)=G';
ColorMap(:,3)=B';
```

Figure 8:
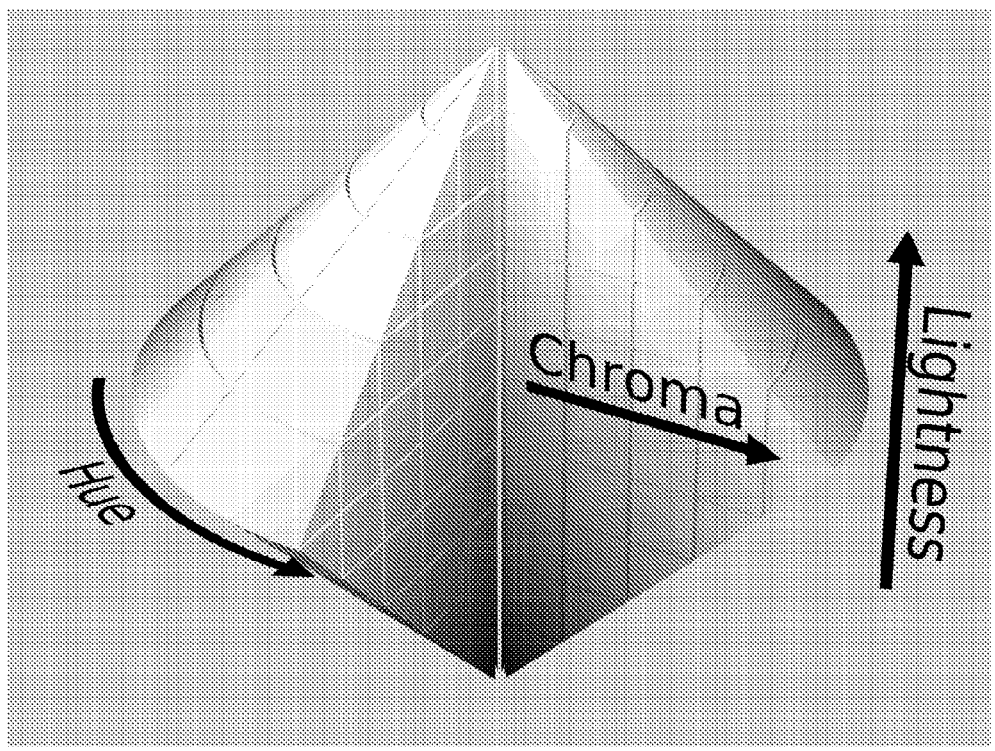
FIG. 8 depicts a biconic map of Hue, Chroma, and Lightness utilized in an embodiment.

FIG. 8 depicts the biconic map of Hue, Chroma (or saturation) and Lightness, with the pure colors residing on the surface and the neutral, achromatic or grey color ranging from black at lightness 0 to white or lightness value 1 at the top.

The color map utilized in one embodiment started at black, or lightness of 0 spirals in a helical fashion through the HSL cone through a central point of grey, while picking up a hint of color but remaining internal to the HSL space and ended up at pure white or lightness of 1. This mapping yields a sense of heightened resolution of the image utilizing a standard 8-bit RGB monitor.

While various embodiments have been described above, it should be understood that they have been presented by way of example only, and not of limitation. Likewise, the various diagrams may depict an example architecture or other configuration and is intended to aid in understanding the features and functionality that can be included. The discovery is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present inventions. Also, a multitude of different constituent module names other than those depicted herein can be applied to the various partitions.

Although, described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments, whether or not such embodiments are described and whether or not such features are presented as being a part of a described embodiment. Thus the breadth and scope of the present disclosure should not be limited by any of the above-described exemplary embodiments.

As will become apparent to one of ordinary skill in the art after reading this document, the illustrated embodiments and their various alternatives can be implemented without confinement to the illustrated examples. For example, block diagrams and their accompanying description should not be construed as mandating a particular architecture, geometry or configuration.

What is claimed is:

1. A method for processing an image comprising:
receiving an image from a high-bit sensor;
interpolating the image to its final output size;
globally processing the image and locally processing the image, wherein globally processing includes:
implementing Shannon-based entropy mapping if a number of unique values produced by the high-bit sensor exceeds the number of unique values that can be displayed in the final output size; and
implementing rank based mapping if a number of unique values produced by the high-bit sensor is lower than the number of unique values that can be displayed in the final output size;
weighting the globally processed image and the locally processed image;
combining the weighted images; and
outputting the image to a display wherein the weighted images are combined according to the equation ((WG*pixel value)+(WL*pixel value))/(WG+WL) where WG is weighting factor for the globally processed image and WL is weighting factor for the locally processed image.

2. The method of claim 1, further comprising:
color enhancing the combined weighted image before outputting the image to the display.

3. The method of claim 2, wherein the global processing and the local processing are performed in parallel.

4. The method of claim 1, further comprising:
dynamically averaging the image wherein the image is a video image comprising consecutive frames.

5. The method of claim 4, further comprising:
color enhancing the combined image before outputting the image to a display.

6. The method of claim 5, wherein the global processing and the local processing are performed in parallel.

7. The method of claim 4, wherein the dynamic averaging occurs on a pixel by pixel basis.

8. The method of claim 1, wherein the global processing and the local processing are performed in parallel.

9. The method of claim 1, wherein the local processing is a rank based processing.

10. The method of claim 1, wherein the high-bit sensor is chosen from at least one of the following:
an x-ray camera, a high dynamic range monochromatic day camera, an image intensifier, and an infrared camera.

11. The method of claim 1 wherein the weighting factor for the globally processed image is greater than the weighting factor for the locally processed image.

12. The method of claim 1 wherein the weighting factor for the locally processed image is greater than the weighting factor for the globally processed image.

13. The method of claim 1 wherein the local processing utilizes a sliding pixel window.

14. The method of claim 13 wherein the sliding pixel window size is variable.

15. The method of claim 13 wherein the sliding pixel window size is user selectable.

16. The method of claim 13 wherein the sliding pixel window size is between 9×9 pixels and 25×25 pixels.

17. The method of claim 13 wherein the sliding pixel window size is about 25 pixels by 25 pixels.

18. A computer-implemented system, comprising:
one or more processors; and
one or more non-transitory computer-readable storage mediums containing instructions configured to cause the one or more processors to perform operations including:
receiving an image from a high-bit sensor;
interpolating the image to its final output size;
globally processing the image and locally processing the image, wherein globally processing includes:
implementing Shannon-based entropy mapping if a number of unique values produced by the high-bit sensor exceeds the number of unique values that can be displayed in the final output size; and
implementing rank based mapping if a number of unique values produced by the high-bit sensor is lower than the number of unique values that can be displayed in the final output size;
weighting the globally processed image and the locally processed image;
combining the weighted images according to the equation ((WG*pixel value)+(WL*pixel value))/(WG+WL) where WG is weighting factor for the globally processed image and WL is weighting factor for the locally processed image; and outputting the image to a display.

19. The system of claim 18, further comprising instructions configured to cause the one or more processors to perform operations including:
color enhancing the combined weighted image before outputting the image to the display.

20. The system of claim 19, wherein the global processing and the local processing are performed in parallel.

21. The system of claim 18, further comprising instructions configured to cause the one or more processors to perform operations including:
dynamically averaging the image wherein the image is a video image comprising consecutive frames.

22. The system of claim 21, further comprising instructions configured to cause the one or more processors to perform operations including:
color enhancing the combined image before outputting the image to a display.

23. The system of claim 22, wherein the global processing and the local processing are performed in parallel.

24. The system of claim 21, wherein the dynamic averaging occurs on a pixel by pixel basis.

25. The system of claim 18, wherein the global processing and the local processing are performed in parallel.

26. The system of claim 18, wherein the local processing is a rank based processing.

* * * * *